United States Patent
Fetter

(10) Patent No.: US 11,830,302 B2
(45) Date of Patent: Nov. 28, 2023

(54) COMPUTER SYSTEM FOR UTILIZING ULTRASONIC SIGNALS TO IMPLEMENT OPERATIONS FOR AUTONOMOUS VEHICLES

(71) Applicant: UATC, LLC, Pittsburgh, PA (US)

(72) Inventor: Jacob Fetter, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 616 days.

(21) Appl. No.: 16/828,632

(22) Filed: Mar. 24, 2020

(65) Prior Publication Data

US 2021/0304532 A1    Sep. 30, 2021

(51) Int. Cl.
*G07C 9/00* (2020.01)
*B60W 60/00* (2020.01)
*G06V 20/56* (2022.01)

(52) U.S. Cl.
CPC ....... *G07C 9/00309* (2013.01); *B60W 60/001* (2020.02); *G06V 20/56* (2022.01); *G07C 2009/0042* (2013.01); *G07C 2009/00412* (2013.01)

(58) Field of Classification Search
CPC ...... G07C 9/00309; G07C 2009/00412; G07C 2009/0042; G07C 2009/00238; G07C 2009/00801; G07C 2209/63; B60W 60/001; G06V 20/56; G06K 9/00536
See application file for complete search history.

(56) References Cited

U.S. PATENT DOCUMENTS

| | | | |
|---|---|---|---|
| 4,405,943 A | 9/1983 | Kanaly | |
| 4,602,256 A * | 7/1986 | Kago | G08C 23/02 340/12.54 |
| 5,212,645 A | 5/1993 | Wildes et al. | |
| 5,990,579 A * | 11/1999 | Ricci | E05B 47/0047 292/341.16 |
| 6,339,745 B1 | 1/2002 | Novik | |
| 6,424,638 B1 | 7/2002 | Ray | |
| 7,095,318 B1 | 8/2006 | Bekhor | |
| 7,359,004 B2 | 4/2008 | Yu | |
| 7,889,065 B2 | 2/2011 | Smith | |
| 7,904,092 B2 | 3/2011 | Hart | |
| 8,155,081 B1 | 4/2012 | Mater | |
| 8,370,392 B1 | 2/2013 | Hunt | |
| 8,417,239 B1 | 4/2013 | DeCusatis | |
| 8,437,890 B2 | 5/2013 | Anderson | |
| 8,452,310 B1 | 5/2013 | Orlik | |

(Continued)

FOREIGN PATENT DOCUMENTS

| AU | 2019261826 | 12/2019 |
|---|---|---|
| CN | 104464368 | 3/2015 |

(Continued)

OTHER PUBLICATIONS

ISR in PCT/US2021/018249 dated May 28, 2021.

(Continued)

*Primary Examiner* — Curtis J King
(74) *Attorney, Agent, or Firm* — Dority & Manning, P.A.

(57) ABSTRACT

In some examples, a control system for a vehicle can detect a set of ultrasonic signals generated by a mobile computing device of a user. Additionally, the control system can determine a pin code from the set of ultrasonic signals. Moreover, the control system can perform one or more vehicle operations to initiate fulfillment of a transport request that is associated with the determined pin code, upon the user being determined to be within a given proximity distance of the vehicle.

20 Claims, 6 Drawing Sheets

(56) References Cited

U.S. PATENT DOCUMENTS

| | | |
|---|---|---|
| 8,676,431 B1 | 3/2014 | Mariet |
| 8,818,719 B1 | 8/2014 | Thanayankizil |
| 8,880,273 B1 | 11/2014 | Chatham |
| 8,954,252 B1 | 2/2015 | Urmson |
| 9,014,905 B1 | 4/2015 | Whitehill |
| 9,025,463 B1 | 5/2015 | Mankee |
| 9,057,620 B2 | 6/2015 | Dave |
| 9,087,348 B2 | 7/2015 | Petrucci |
| 9,107,132 B2 | 8/2015 | Kowshik |
| 9,384,402 B1 | 7/2016 | Furman |
| 9,432,929 B1 | 8/2016 | Ross |
| 9,441,975 B2 | 9/2016 | Pylappan |
| 9,465,338 B2 | 10/2016 | Fairfield |
| 9,467,832 B2 | 10/2016 | Haney |
| 9,475,422 B2 | 10/2016 | Hillis |
| 9,481,367 B1 | 11/2016 | Gordon |
| 9,483,948 B1 | 11/2016 | Gordon |
| 9,488,490 B2 | 11/2016 | Chintakindi |
| 9,537,561 B1 | 1/2017 | Kotecha |
| 9,557,183 B1 | 1/2017 | Ross |
| 9,565,625 B1 | 2/2017 | MacNeille |
| 9,603,158 B1 | 3/2017 | Ross |
| 9,612,123 B1 | 4/2017 | Levinson |
| 9,807,564 B2 | 10/2017 | Aksamit |
| 10,182,438 B2 | 1/2019 | Dayanandan |
| 10,293,818 B2 | 5/2019 | Kroop |
| 10,325,442 B2 | 6/2019 | Brinig |
| 10,355,788 B2 | 7/2019 | Cirit |
| 11,120,655 B1 * | 9/2021 | Huggins ............. G07C 9/00 |
| 2001/0038610 A1 | 11/2001 | Decker |
| 2002/0029108 A1 | 3/2002 | Liu |
| 2003/0073442 A1 | 4/2003 | Fattouch |
| 2004/0029558 A1 | 2/2004 | Liu |
| 2004/0157549 A1 | 8/2004 | Dold |
| 2004/0212540 A1 | 10/2004 | Kennedy |
| 2005/0090226 A1 | 4/2005 | Wolf |
| 2005/0163460 A1 | 7/2005 | Merkel |
| 2005/0168353 A1 | 8/2005 | Dement |
| 2005/0171654 A1 | 8/2005 | Nichols |
| 2006/0059024 A1 | 3/2006 | Bailey |
| 2006/0189533 A1 | 8/2006 | Fujishima |
| 2006/0229070 A1 | 10/2006 | de La Chapelle |
| 2006/0229103 A1 | 10/2006 | Monk |
| 2006/0229104 A1 | 10/2006 | de La Chapelle |
| 2006/0235615 A1 | 10/2006 | Kato |
| 2007/0077945 A1 | 4/2007 | Sheynblat |
| 2007/0178911 A1 | 8/2007 | Baumeister |
| 2007/0185646 A1 | 8/2007 | Neugebauer |
| 2007/0224939 A1 | 9/2007 | Jung |
| 2007/0279241 A1 | 12/2007 | Jung |
| 2008/0097688 A1 | 4/2008 | Tashev |
| 2008/0108355 A1 | 5/2008 | Oleszcsuk |
| 2008/0186882 A1 | 8/2008 | Scherzer |
| 2008/0242305 A1 | 10/2008 | Kahlert |
| 2009/0005097 A1 | 1/2009 | Shaffer |
| 2009/0109061 A1 | 4/2009 | McNew et al. |
| 2009/0196234 A1 | 8/2009 | Greene |
| 2009/0196258 A1 | 8/2009 | Escobar Sanz |
| 2009/0254254 A1 | 10/2009 | Wang |
| 2009/0286526 A1 | 11/2009 | Matsunaga |
| 2010/0082193 A1 | 4/2010 | Chiappetta |
| 2010/0120466 A1 | 5/2010 | Li |
| 2010/0151865 A1 | 6/2010 | Camp, Jr. |
| 2010/0290359 A1 | 11/2010 | Dewey |
| 2011/0128161 A1 | 6/2011 | Bae et al. |
| 2011/0130894 A1 | 6/2011 | Kim |
| 2011/0171960 A1 | 7/2011 | Hershey |
| 2011/0208417 A1 | 8/2011 | Fink |
| 2011/0227757 A1 | 9/2011 | Chen |
| 2012/0171963 A1 | 7/2012 | Tsfaty |
| 2012/0214416 A1 | 8/2012 | Kent |
| 2013/0006674 A1 | 1/2013 | Bowne |
| 2013/0064134 A1 | 3/2013 | Xiong |
| 2013/0073327 A1 | 3/2013 | Edelberg |
| 2013/0115956 A1 | 5/2013 | Ewert |
| 2013/0122934 A1 | 5/2013 | Branch |
| 2013/0132140 A1 | 5/2013 | Amin |
| 2013/0142035 A1 | 6/2013 | Sunderrajan |
| 2013/0169408 A1 | 7/2013 | Endo |
| 2013/0171930 A1 | 7/2013 | Anand |
| 2013/0182575 A1 | 7/2013 | McLean |
| 2013/0184985 A1 | 7/2013 | Bollars |
| 2013/0218469 A1 | 8/2013 | Turton |
| 2013/0225229 A1 | 8/2013 | Al-Shalash |
| 2013/0279349 A1 | 10/2013 | Pandey |
| 2013/0322388 A1 | 12/2013 | Ahn |
| 2014/0087739 A1 | 3/2014 | Weaver |
| 2014/0180501 A1 | 6/2014 | Kyllmann |
| 2014/0188377 A1 | 7/2014 | Bonawitz |
| 2014/0297116 A1 | 10/2014 | Anderson |
| 2014/0306833 A1 | 10/2014 | Ricci |
| 2014/0309789 A1 | 10/2014 | Ricci |
| 2014/0309814 A1 | 10/2014 | Ricci |
| 2014/0309864 A1 | 10/2014 | Ricci |
| 2014/0355476 A1 | 12/2014 | Anderson |
| 2015/0023256 A1 | 1/2015 | Liu |
| 2015/0063144 A1 | 3/2015 | Kozat |
| 2015/0081212 A1 | 3/2015 | Mitchell |
| 2015/0097864 A1 | 4/2015 | Alaniz |
| 2015/0127439 A1 | 5/2015 | Campos De Figueiredo Faceira |
| 2015/0133167 A1 | 5/2015 | Edge |
| 2015/0149078 A1 | 5/2015 | Profous |
| 2015/0175161 A1 | 6/2015 | Breed |
| 2015/0178953 A1 | 6/2015 | Gao |
| 2015/0181414 A1 | 6/2015 | Bretscher |
| 2015/0215738 A1 | 7/2015 | Frusina |
| 2015/0222372 A1 | 8/2015 | Le Grand |
| 2015/0244826 A1 | 8/2015 | Stenneth |
| 2015/0248131 A1 | 9/2015 | Fairfield |
| 2015/0264519 A1 | 9/2015 | Mirzaei |
| 2015/0281906 A1 | 10/2015 | Tseng |
| 2015/0308841 A1 | 10/2015 | Matsunaga |
| 2015/0310868 A1 | 10/2015 | Mallik |
| 2015/0331111 A1 | 11/2015 | Newman |
| 2015/0334750 A1 | 11/2015 | Mehta |
| 2015/0339928 A1 | 11/2015 | Ramanujam |
| 2015/0346718 A1 | 12/2015 | Stenneth |
| 2015/0348408 A1 | 12/2015 | Demisse |
| 2016/0006723 A1 | 1/2016 | Wilson |
| 2016/0031441 A1 | 2/2016 | Foley |
| 2016/0034828 A1 | 2/2016 | Sarawgi |
| 2016/0073117 A1 | 3/2016 | Grasmug |
| 2016/0105233 A1 | 4/2016 | Jalali |
| 2016/0139594 A1 | 5/2016 | Okumura |
| 2016/0157254 A1 | 6/2016 | Novlan |
| 2016/0161266 A1 | 6/2016 | Crawford |
| 2016/0191861 A1 | 6/2016 | Tinskey |
| 2016/0260328 A1 | 9/2016 | Mishra |
| 2016/0282468 A1 | 9/2016 | Gruver |
| 2016/0301698 A1 | 10/2016 | Katara |
| 2016/0323356 A1 | 11/2016 | Ribeiro |
| 2016/0334229 A1 | 11/2016 | Ross |
| 2016/0334230 A1 | 11/2016 | Ross |
| 2016/0337935 A1 | 11/2016 | Patil |
| 2016/0358475 A1 | 12/2016 | Prokhorov |
| 2016/0370801 A1 | 12/2016 | Fairfield |
| 2017/0057475 A1 | 3/2017 | Lim |
| 2017/0120804 A1 | 5/2017 | Kentley |
| 2017/0132334 A1 | 5/2017 | Levinson |
| 2017/0192423 A1 | 7/2017 | Rust |
| 2017/0223712 A1 | 8/2017 | Stephens |
| 2017/0268888 A1 | 9/2017 | Blumenberg |
| 2017/0277186 A1 | 9/2017 | Ross |
| 2017/0371338 A1 | 12/2017 | Kamata |
| 2018/0046182 A1 | 2/2018 | Joyce |
| 2018/0059683 A1 | 3/2018 | Cefkin |
| 2018/0181118 A1 | 6/2018 | Yoneda |
| 2018/0198535 A1 | 7/2018 | Cirit |
| 2018/0257643 A1 | 9/2018 | Kroop |
| 2018/0257661 A1 | 9/2018 | Kroop |
| 2018/0281815 A1 | 10/2018 | Stentz |
| 2019/0138008 A1 | 5/2019 | Ross |
| 2019/0143967 A1 | 5/2019 | Kutila |
| 2019/0167848 A1 | 6/2019 | Kroop |

(56) References Cited

U.S. PATENT DOCUMENTS

| | | | |
|---|---|---|---|
| 2019/0278298 A1 | 9/2019 | Pedersen | |
| 2019/0317491 A1 | 10/2019 | Kobayashi | |
| 2019/0327003 A1 | 10/2019 | Cirit | |
| 2019/0393618 A1* | 12/2019 | Guthrie | H01Q 3/36 |
| 2020/0068434 A1 | 2/2020 | Pedersen | |
| 2020/0276959 A1 | 9/2020 | Cho | |
| 2020/0373675 A1* | 11/2020 | Ahmed | H01Q 1/38 |
| 2021/0001873 A1* | 1/2021 | Ingrody | G05D 1/0088 |

FOREIGN PATENT DOCUMENTS

| | | |
|---|---|---|
| DE | 10118188 | 10/2002 |
| DE | 102009014975 | 9/2010 |
| EP | 2709207 | 3/2014 |
| GB | 2511860 | 9/2014 |
| IN | 332817 | 5/2019 |
| JP | 2003-531505 | 10/2003 |
| JP | 2006-227672 | 8/2006 |
| JP | 2016157395 | 2/2018 |
| WO | WO 2011/069170 | 6/2011 |
| WO | WO-2018128781 | 7/2018 |
| WO | WO 2019/074135 | 4/2019 |

OTHER PUBLICATIONS

Examination Report No. 1 in AU 2019261826 dated Dec. 18, 2020.
Office Action in 10-2020-7009679 dated Jan. 5, 2021.
Office Action in CA 3048145 dated Nov. 26, 2020.
EESR in EP 17890534.5 dated Oct. 7, 2020.
Jennifer J.N.Liu, et al., "Mobile Ad Hoc Networking with a View of 4G Wireless: Imperatives and Challenges", In: Mobie Ad Hoc Networking, 2004 Institute of Electrical and Electronics Engineers, Inc. Jan. 28, 2005, Section 1.2.
ISR and WO issued in PCT/US2016/065656 dated Apr. 11, 2017.
ISR and WO issued in PCT/US2016/068563 dated Apr. 17, 2017.
Fong, Terrence et al., "Vehicle teleoperation interfaces", Autonomous Roots 11, pp. 9-18, 2001.
Reuschenbach, Arturo et al., "iDriver-human machine interface for autonomous cars", 2011 Eighth International Coference on Information Technology: New Generations, Las Vegas, NV 2011, pp. 435-440.
IPRP issued Sep. 7, 2018 in PCT/US2016/068563.
SESR issued Dec. 4, 2018 in EP 16873859.9.
EESR issued Mar. 8, 2019 in EP 16873859.9.
Office Action in dated Apr. 17, 2020 in EP 16873859.9.
ISR and Written Opinion issued in PCT/US2017/066859 dated Mar. 15, 2018.
Office Action in AU 2017390194 dated Jul. 26, 2019.
Office Action in CA 3048145 dated Jul. 29, 2019.
Office Action in KR 10-2019-7022998 dated Sep. 2, 2019.
First Office Action in CN 201780086102.1 dated Dec. 30, 2019.
Notice of Allowance in KR 10-2019-7022998 dated Jan. 2, 2020.
Office Action in JP 2019-534853 dated Feb. 5, 2020.

* cited by examiner

COMPUTER SYSTEM FOR UTILIZING ULTRASONIC SIGNALS TO IMPLEMENT OPERATIONS FOR AUTONOMOUS VEHICLES

BACKGROUND

Ultrasound is a set of audio frequencies beyond the range of human hearing, defined to be 20 kHz and above. However, most people cannot hear sounds above 18 kHz. Everyday use of ultrasonic frequencies (or frequencies higher than most people can hear) is underutilized. For example, while most smartphones have the capability to play ultrasonic frequencies, they are not typically utilized.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
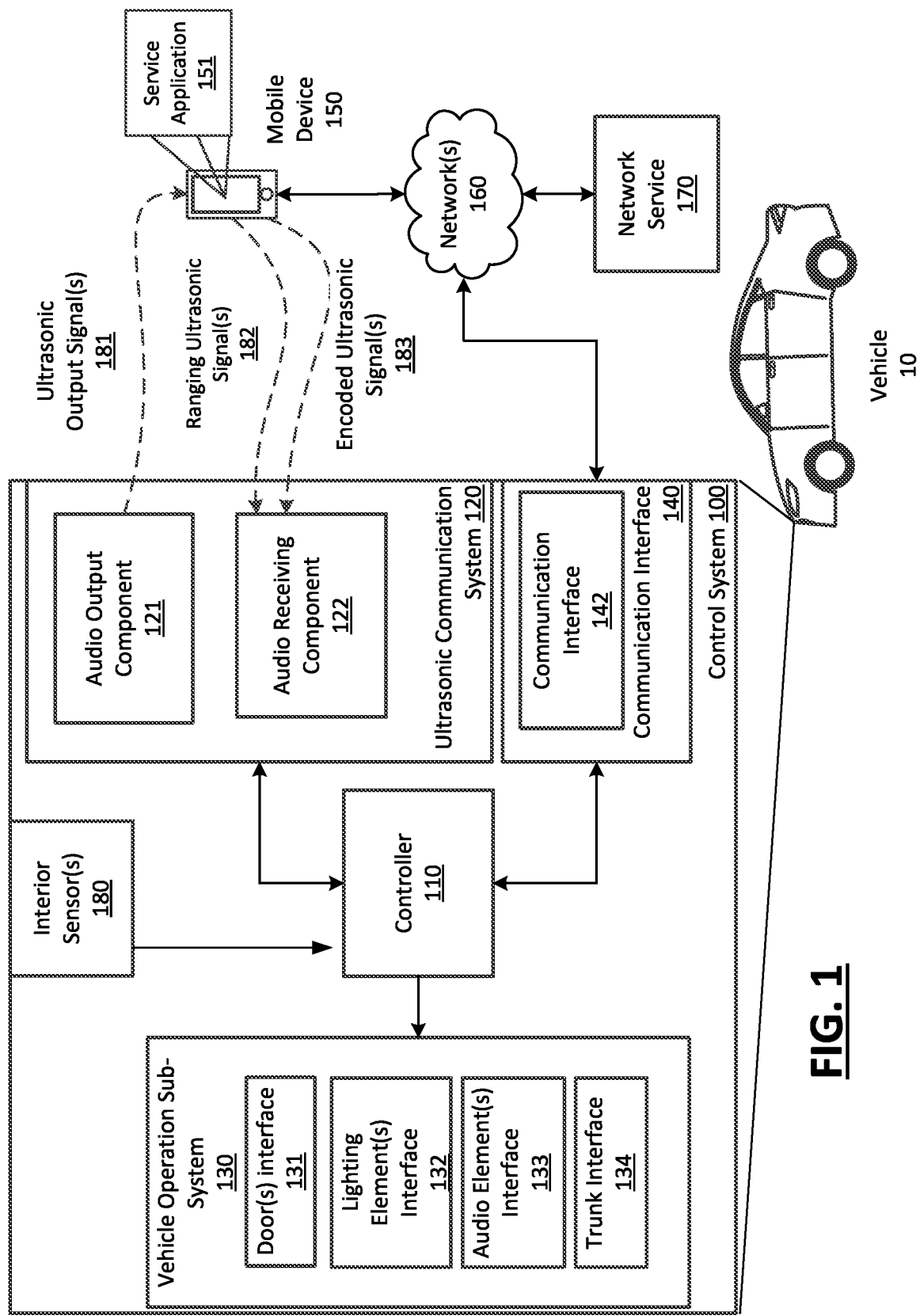
FIG. 1 illustrates an example computer or control system for a vehicle for utilizing ultrasonic signals to implement operations of the vehicle.

Examples include a control or computer system that utilizes ultrasonic signals to implement or trigger performance of vehicle operations of vehicles, such as autonomous vehicles (AVs). In such examples, the vehicle operations can aid requesters that are assigned to the vehicles to better identify and utilize the vehicles when the requesters meet the vehicles near or at a designated pickup location. Examples of vehicle operations include, opening one or more doors of the assigned vehicle, and causing the assigned vehicle to turn on and/or modulate a lighting element of the assigned vehicle (e.g., headlights or other lighting elements incorporated into the body of the assigned vehicle).

In various examples, ultrasonic signals can correspond to a unique pin code. In such examples a control system can utilize such ultrasonic signals to verify that a vehicle and a requester have been assigned to one another. Additionally, the control system can trigger performance of vehicle operations of an assigned vehicle, in response to such verifications. In examples, a network service can generate the unique pin code. For example, the network service can assign a vehicle to a requester based on a transport request to a mobile device of the requester and/or the assigned vehicle. The mobile device of the requester and/or the assigned vehicle can output an ultrasonic signal that corresponds to the unique pin code. The control system can detect and process the ultrasonic signals that correspond to the unique pin code to verify the vehicle-requester assignment.

A control system can be included in an assigned vehicle and/or a mobile device of the requester. In implementations where the assigned vehicle includes the control system, the control system can trigger the performance of a vehicle operation based on a determination that detected ultrasonic signals outputted from a mobile device of a reqester corresponds to the unique pin code of an assigned transport request. For example, the control system of the assigned vehicle can automatically open a door of the assigned vehicle if the control system determines that the detected ultrasonic signals correspond to the unique pin code of the assigned transport request.

In some examples, a network service can provide additional information to the assigned vehicle that specifies particular operations the assigned vehicle is to perform once its determined that the ultrasonic signals correspond to the unique pin code. For example, based on service parameters of the assigned transport request, the information can specify that the requester has luggage or would like to use the trunk. That way, when the control system of the assigned vehicle determines that the ultrasonic signal corresponds to the unique pin code, the assigned vehicle can automatically open the trunk.

For added security, a control system of an assigned vehicle can trigger the vehicle operations of the assigned vehicle when the requester is close enough to the assigned vehicle. For example, the control system can implement a first process to determine how far away the requester is relative to the assigned vehicle, and a second process to implement one or more of the vehicle operations. In examples, the first process can be based on location information of the mobile device of the requester that is received by the network service. In examples where the control system cannot communicate with the network service (e.g., poor or no network connection), the first process can be based on a unique set of ultrasonic signals outputted from the mobile device of the requester. In such examples, the unique set of ultrasonic signals can be of a different frequency or patter than the ultrasonic signals that correspond to the unique pin code. That way, the unique pin code is not exposed to intentional or unintentional recording by a nefarious third-party entity.

The second process can include an exchange and processing of ultrasonic signals outputted by a mobile device of the requester. In some examples, the control system can implement the second process in response to determining that the requester is within the predetermined distance threshold of the assigned vehicle. For example, the control system determines that the requester is within a proximity distance threshold to the assigned vehicle. Additionally, the control system can cause the assigned vehicle to request, via the network service, the mobile device of the requester to output ultrasonic signals, in response to determining that the requester is within the proximity distance threshold. The control system can then process the ultrasonic signals from the mobile device of the requester to determine whether the ultrasonic singles correspond to the unique pin code of a transport request that the assigned vehicle is assigned to. If the control system determines that the detected ultrasonic signals correspond to the unique pin code, the control system can trigger performance of a vehicle operation.

Once a requester is inside a vehicle that is assigned to the transport request of the requester and the transport service has begun, a mobile computing device of the requester can periodically chirp or output ultrasonic signals while the transport service is in progress. A control system of the assigned vehicle can monitor whether the requester is still in the vehicle based on the detected chirps/ultrasonic signals. In some examples, the control system can determine that the control system no longer detects ultrasonic chirps or signals within the vehicle while the vehicle is still traveling towards a destination location of a transport service. As such, the control system can determine that the requester has left before the assigned vehicle reaches the destination location. Additionally, the control system can instruct the assigned vehicle to reroute and cease traveling towards the destination location.

When the transport service has ended, a control system can determine whether or not a requester has left their mobile device in an assigned vehicle. For example, the control system, via a network service, can cause the mobile device of the requester to output ultrasonic signals. If the control system of the assigned vehicle detects the ultrasonic signals, the assigned vehicle can determine the mobile device is still in the assigned vehicle after the transport service has ended and/or the requester has left the assigned vehicle. In some examples, the control system determines the transport service has ended after arriving at the destination location or after a predetermined time threshold thereafter. In other examples, the control system determines the requester has left the car based on data of sensors on the door indicating that the door has opened and closed.

In implementations where a mobile computing device of the requester includes a control system, the mobile computing device can be authorized to cause/control the assigned vehicle to perform the vehicle operations. The authorization can be based on a determination that the detected ultrasonic signals outputted from a vehicle correspond to the unique pin code of a transport request the vehicle is assigned to. For example, the control system of the mobile computing device of the requester detects ultrasonic signals from an assigned vehicle. Additionally, the control system determines that the detected ultrasonic signals corresponds to the unique pin code of the transport request the network service provided. Upon the control system determining that the detected ultrasonic signal corresponds to the unique pin code, the control system of the mobile computing device can be authorized to trigger or cause performance of various vehicle operations, such as unlocking and/or opening the door of the assigned vehicle.

As provided herein, the terms "driver" and "service provider" are used throughout this application interchangeably to describe a person utilizing a provider application on a mobile computing device to provide on-demand transport services. The terms "requester," "service requester," and "user" are used throughout this application interchangeable to describe a person or group of people who utilize a requester application on a mobile computing device to request, over one or more networks, on-demand transport services from a computing system of a network service.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Moreover, examples described herein can generally require the use of specialized computing devices, including processing and memory resources. For example, one or more examples described may be implemented, in whole or in part, on computing devices such as servers, desktop computers, cellular or smartphones, laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor or may be architectures employing multiple processor designs for increased computing capability.

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Description

FIG. 1 illustrates an example control system for utilizing ultrasonic signals to implement select control operations for a vehicle. In examples, control system 100 detects and processes ultrasonic signals (e.g., an acoustic signal in the ultrasonic range or high frequency range, such as above 18 kHz) which generated by a nearby device (e.g., mobile device of a user), to implement or trigger performance of one or more select vehicle operations. By way of example, the control system can process ultrasonic signals to perform, or trigger performance of vehicle operations that include opening a vehicle door or trunk, starting the vehicle, and/or turning on interior or exterior vehicle lights. In some examples, the control system 100 is implemented for an autonomous vehicle, and the vehicle operations are selected to facilitate the user's use of the autonomous vehicle as a passenger.

With reference to an example of FIG. 1, control system 100 includes controller 110, ultrasonic communication system (UCS) 120, vehicle operation sub-system 130, and one or more types of communication interfaces 140, 142.

According to examples, control system 100 includes communication interface 140 to enable the control system 100 to communicate with a network service 170. Additionally, communication interface 140 includes communication interface 142 to enable the control system 100 to communicate with corresponding mobile device 150 of one or more users of autonomous vehicle 10.

In examples, controller 110 communicates with UCS 120 to (i) monitor for and detect ultrasonic signals, and (ii) process detected ultrasonic signals to determine an instruction data set (e.g., a unique pin code). The UCS 120 can include an audio receiving component 122, such as a microphone array, which may be optimized or otherwise configured to detect ultrasonic signals. In variations, UCS 120 can include logic to process the detected ultrasonic signals (e.g., noise cancellation). Still further, in other variations, UCS 120 can include logic to implement higher-level determinations, including interpreting encoded signals as data, commands or other instruction data.

Additionally, controller 110 can communicate with UCS 120 to emit ultrasonic signals (e.g., ultrasonic signal(s) 181). In examples, UCS 120 also includes an emitter or audio output component 121 to output such ultrasonic signals (e.g., ultrasonic signal(s) 181). Audio output component 121 can include a speaker that can emit an acoustic signal in the ultrasonic range or a high frequency range (above 18 kHz). For example, the controller 110 may communicate an input (e.g., unique identifier or instruction) to UCS 120, which in turn uses audio output component 121 to generate ultrasonic signal 181 that is based on the communicated input.

In examples, ultrasonic signals can embed a unique pin code that control system 100 can use to verify that the mobile device 150 is associated with a person who is authorized to receive transport from the vehicle. Controller 110 can obtain a unique pin code from network service 170, either before or after detecting the transmitted pin code of the user. Additionally, controller 110 can compare the detected pin code of the ultrasonic transmission of the user with the pin code communicated by the 170 to determine whether there is a match. If controller 110 makes the determination that there is a match, controller 110 can accept commands (e.g., from mobile device 150 of a requester/user, as described with some examples) and/or perform vehicle operations for the benefit of the requester.

In some examples, control system 100 is implemented on autonomous vehicle 10, in connection with the autonomous vehicle being made available for use as part of a transport service (e.g., on-demand transport service). The requester can operate service application 151 on mobile device to request transport service. Network service 170 can receive the requester's transport request and match the requester with autonomous vehicle 10. Network service 170 can communicate information to mobile device 150 for the requester. The information can identify autonomous vehicle 10 (e.g., color of vehicle, license plate, etc.) and/or the vehicle location of autonomous vehicle 10. Network service 170 can also transmit a pin code for service application 151, to enable autonomous vehicle 10 to authenticate the requester. The pin code can, for example, be in the form of a hash which is unique and solely associated with the transport request. As the requester approaches autonomous vehicle 10 (e.g., inside a parking structure), service application 151 causes mobile device 150 to send a encoded ultrasonic signal 183 which includes the pin code. Control system 100 detects the transmission and pin code and authenticates the requester. As described by various examples, Control system 100 can continue to communicate with mobile device 150 and/or perform vehicle operations on behalf of the requester.

Control system 100 can include vehicle operation sub-system 130 to enable controller 110 to trigger or initiate performance of one or more vehicle operations of a vehicle. Vehicle operation sub-system 130 can include one or more interfaces to components of autonomous vehicle 10. In examples, vehicle operation sub-system 130 includes door interface 131, interior or exterior lighting interface 132, audible output interface 133, trunk interface 134, and/or an alarm or security interface 135. Controller 110 can communicate with door interface 131 to perform a vehicle operation such as open or close a door, open or close a window of a door, and/or lock or unlock a door. Still further, controller 110 can communicate with door interface 131 to specify select doors for the vehicle operation, as well as values for use in implementing the vehicle operations (e.g., open windows partially or fully).

Controller 110 can also communicate instructions via interior or exterior lighting interface 132 to perform vehicle operations relating to lighting components of the vehicle. By way of example, the lighting components which can be controlled through interior or exterior lighting interface 132 can include interior lights (e.g., interior dome light, console lights, dashboard illumination) or exterior lights (e.g., headlights, door handle lights, etc.). The instructions communicated by controller 110 can include binary-type instructions (e.g., on or off instructions), or instructions which specify a value in connection with the operation to be performed (e.g., value to adjust lighting output (e.g., lumens), or value to select type of light (e.g., flashing, color, etc.).

In examples, audible output interface 133 can correspond to an interface to an alarm, horn or other mechanism of the vehicle which can generate a human-detected alarm. Accordingly, in some examples, controller 110 can communicate instructions via audible output interface 133 to cause the vehicle to emit a human detectable sound.

As an addition or variation, controller 110 can also communicate instructions to trunk interface 134 to cause the vehicle to lock or unlock a vehicle trunk, and/or to open or close the vehicle trunk. Still further, in other variations, vehicle operation sub-system 130 can include interfaces to components such as a vehicle media player or alarm system (e.g., alarm or security interface 135).

In operation, controller 110 and UCS 120 operate to (i) detect an ultrasonic signal from a source, (ii) decode or otherwise determine a pin code from the detected ultrasonic signal, and/or (iii) perform one or more operations based on the detected ultrasonic signal. In some examples, controller 110 can compare the pin code to one or more stored values to determine an operation to perform.

As described with various examples, the source of the detected ultrasound signal can correspond to a nearby mobile device (e.g., mobile device 150), and controller 110 can utilize the pin code to verify that a user of mobile device 150 is authorized to access and/or utilize the vehicle. For example, the pin code can identify the user as an individual that is authorized to receive transport from the vehicle. In some implementations, mobile device 150 obtains the pin code from network service 170. For example, mobile device 150 can include a service application which can be launched to communicate with network service 170. Additionally, network service 170 can communicate with mobile device 150 via the service application to provide mobile device 150 with a pin code. Mobile device 150 can then encode and transmit the ultrasonic signal (e.g., using logic provided through the service application), and control system 100 can detect and decode the ultrasonic signal to determine the transmitted pin code. In some examples, the pin code is session or use-based, such that the pin code is active for a predetermined duration or until one or more events are detected as occurring (e.g., by mobile device 150). In variations, the pin code is persistent over multiple sessions or usages of the pin code by the user. In such cases, the pin code can be affixed to mobile device 150 for an extended duration of time.

In examples, controller 110 compares a pin code that is encoded within the detected ultrasonic signal to a stored value. If controller 110 determines that the pin code matches with the stored value, then the source of the ultrasonic signal (or user thereof) may be deemed as an authorized user for purpose of entry into the vehicle (e.g., autonomous vehicle 10).

As an addition or alternative, controller 110 can retrieve a pin code from network service 170, such as in response to detecting the ultrasonic signal and/or determining the pin code embedded within the ultrasonic signal. In such examples, controller 110 compares the determined pin code of the ultrasonic signal with the pin code retrieved from network service 170 in order to determine if there is a match. In some examples, controller 110 processes the ultrasonic signal to determine the pin code, and in response to determining the pin code, controller 110 implements a predetermined set of vehicle operations using one or more interfaces of vehicle operation sub-system 130. Thus, for example, controller 110 can automatically communicate a door unlock signal to door interface 131 as a predetermined response to authorizing a detected pin code of an ultrasonic signal.

In variations, controller 110 processes the ultrasonic signal to determine one or more encoded commands. For example, the source (e.g., mobile device 150) can encode a command based on user input (e.g., "turn vehicle on"), such that transmitted ultrasonic signal includes the pin code and the one or more commands of the user. If controller 110 determines that the user is authorized, controller 110 further implements the one or more commands as a select vehicle operation.

As an addition or variation, controller 110 communicate with network service 170 to identify one or more vehicle operations that are to be performed, in connection with the particular user or pin code. For example, mobile device 150 can communicate with network service 170 a set of preferences as to how the user would like to experience the vehicle when he enters the vehicle (e.g., lighting, trunk open, etc.). Network service 170 may, in conjunction with authenticating the pin code, receive or otherwise obtain the preferences of the user (or commands for implementing the preferences of the user through the performance of the vehicle operations).

Still further, control system 100 can communicate with network service 170 to receive data specifying a default set of vehicle operations that control system 100 is to perform for a given user. The default set of vehicle operations can include vehicle operations that are intended to facilitate the user in locating autonomous vehicle 10, or to determine which one of multiple vehicles in a given area is assigned to the user. Thus, for example, when an autonomous vehicle arrives at a pickup location that is in a high traffic area, network service 170 (or alternatively, controller 110) can select the default set of vehicle operations for purpose of facilitating the user in locating the vehicle amongst other vehicles and/or in a particular location. By way of example, the default set of vehicle operations can include one or more passenger doors opening, one or more lighting elements (e.g., head lights, fog lights, indicators, and other lighting elements) activating or modulating, and/or the sound system outputting an audible sound can be automatically triggered.

As an addition or variation, network service 170 and/or controller 110 can recognize contextual information, such as the location of the vehicle, and the time in which the user enters the vehicle. In response, the default set of operations which are selected to be performed by network service 170 and/or controller 110 can be altered in selection (e.g., omit audible output for quiet neighborhood) and/or implementation (e.g., omit less audible noise for quiet neighborhood).

In such implementations, the requester can specify the one or more vehicle operations when making a transport request using service application 151. The transport request can specify a pickup location, a destination location, and/or one or more vehicle operations the assigned vehicle is to perform before, or at the time the requester enters the vehicle. For example, the requester can interact with service application 151 to specify that the user needs access to the trunk of autonomous vehicle 10. In one example, the vehicle operation (e.g., open trunk) is communicated to network service 170, which in turn communicates the vehicle operation to control system 100. Controller 110 subsequently detects ultrasonic signal 182 of mobile device 150, authenticates the user, and automatically performs the vehicle operation (e.g., open trunk). In another example, mobile device 150 communicates the vehicle operation as a separate command to autonomous vehicle 10 using, for example, the ultrasonic medium (or other communication medium, such as Bluetooth or WiFi). Once the user is authenticated, control system 100 accepts and implements the command to perform the vehicle operation from the user (e.g., open trunk).

In some examples, control system 100 implements a proximity monitoring process to determine the proximity of mobile device 150 (which may be assumed to coincide with proximity of the user). The proximity monitoring process can continue until the control system 100 determines that the user is within a threshold proximity distance of the vehicle. Once the proximity monitoring process detects mobile device 150 as being within a threshold distance, the control system 100 can perform one or more vehicle operations for a user of mobile device 150.

In some variations, proximity monitoring can be implemented through communications with network service 170. Network service 170 can communicate with mobile device 150 to obtain location information of mobile device 150, and network service 170 may communicate the determined location of mobile device 150 to controller 110. Alternatively, mobile device 150 can communicate its location directly to controller 110. In other variations, controller 110 can approximate the location of mobile device 150 through processing of ultrasonic signals (or other short-range wireless signals), and controller 110 can implement a process to range mobile device 150. As an addition or variation, mobile device 150 can implement a process to range controller 110 with respect to the location of mobile device 150. In one example, controller 110 and/or mobile device 150 can signal a series or sequence of ultrasonic signals, which controller 110 and/or mobile device 150 can analyze to determine proximity or range of the other.

In cases where mobile device 150 has poor connectivity with the 170, controller 110 can determine the position and/or proximity of mobile device 150 based on the ultrasonic signals transmitted from mobile device 150. Based on the received ultrasonic signals, controller 110 can determine whether mobile device 150 of the requester is within a proximity distance threshold of autonomous vehicle 10.

In some variations, the ultrasonic signals which are transmitted from mobile device 150 can vary by pattern, frequency range or other marker to differentiate ultrasonic signals which are used to range mobile device 150 with respect to the 10 ("ranging ultrasonic signals 182") from ultrasonic signals which are encoded with a pin code and/or one or more commands ("encoded ultrasonic signals 183"). In such implementations, the encoded ultrasonic signals 183 has limited duration of use, thereby reducing the exposure of, for example, the pin code to unauthorized interception or misuse.

In some examples, controller 110 can utilize ultrasonic transmissions to trigger service application 151 of mobile device 150 to perform certain functions. Controller 110 can utilize the ultrasonic transmissions to trigger service application 151 to identify and transmit one or more vehicle operations for controller 110 to implement on autonomous vehicle 10. As another example, controller 110 can determine that a requester of mobile device 150 is within a proximity distance threshold of the assigned vehicle (e.g., autonomous vehicle 10), based on either ranging ultrasonic signals 182 or location information of mobile device 150 that was provided by network service 170. When controller 110 determines the requester is within the proximity distance threshold, controller 110 requests, via network service 170, mobile device 150 to output encoded ultrasonic signals 183. The control system 100 can then detect the encoded ultrasonic signals 183 of mobile device 150, and controller 110 can process the encoded ultrasonic signals 183 to determine a pin code and/or commands. In some examples, controller 110 determines whether the determined pin code corresponds to a unique pin code that network service 170 provided to control system 100. If controller 110 determines the determined pin code corresponds to the unique pin code, controller 110 can determine that the requester and vehicle are assigned to one another and can trigger performance of one or more vehicle operations of the vehicle.

In some implementations, control system 100 can determine which side of the vehicle the requester is approaching on and/or which door of the vehicle the requester is closest to. That way, controller 110 can intelligently trigger or initiate vehicle operations based on a location of the requester relative to the assigned vehicle. In some examples, controller 110 can communicate with sensors included with the assigned vehicle to determine which side (or door) the requester is closest to. In examples, such sensors can include proximity sensors. For example, controller 110 can determine which side of autonomous vehicle 10, and/or which door the requester is closet to, based on the sensor data generated by the proximity sensors.

Additionally, in some examples, controller 110 can utilize UCS 120 to determine which side or door of the vehicle the requester is approaching or closest to. For example, audio receiving component 122 can include an array of microphones which can be used to capture directional information caused by movement of a source of an ultrasonic signal (or series of signals). Controller 110 can interpret the movement to detect a direction or proximity of the user with respect to a particular side or reference of autonomous vehicle 10. In this way, examples provide that controller 110 can determine which side of autonomous vehicle 10, and/or which door the requester is closest to. In turn, the determination of the position of the user with respect to autonomous vehicle 10 can identify, for example, which door to open, and/or more generally, which vehicle operation to perform (e.g., open trunk of vehicle).

Additionally, the determination(s) of direction and/or positioning of the user with a particular reference (e.g., side of vehicle) can be triggered upon a proximity monitoring process determining that the user is within a predetermined distance from the vehicle.

In examples, controller 110 can also help the requester quickly identify which doors are unlocked. For example, based on the determinations on which door the requester is closest to, controller 110 can further cause lighting elements on those particular doors to activate or modulate. Controller 110 can transmit lighting instructions to vehicle operation sub-system 130 specifying which lighting elements on which doors to activate based on the determinations of which door the requester is closest to, or which doors are unlocked/opened.

In some implementations, controller 110 can communicate with one or more interior sensors 180 (e.g., microphones or speakers) that are located inside the assigned vehicle to monitor whether the requester is still inside the assigned vehicle. Additionally, controller 110 can communicate with the one or more interior sensors 180 that are inside the assigned vehicle to determine if ultrasonic signals from mobile device 150 are still detectable by one or more interior sensors 180. If after a set period of time, controller 110 determines the one or more microphones or speakers are no longer detecting or receiving ultrasonic signals from mobile device 150, controller 110 can determine that the requester has left the assigned vehicle.

In some examples, controller 110 can determine that the requester has left the assigned vehicle before the assigned vehicle has reached a destination location specified in the transport request of the requester. For example, controller 110 can monitor the progress of the transport service after the requester has entered the vehicle based on obtained location information from a location-based resource (e.g., a GPS sensor) of the assigned vehicle. Additionally, based on the destination location specified in the transport request of the requestor, controller 110 can determine whether and when the assigned vehicle has arrived at the destination location. Controller 110 can determine that the requester has left the assigned vehicle before the assigned vehicle has reached a destination location based on sensor data of the one or more interior sensors 180. The sensor data can indicate, for example, that one or more interior sensors 180 has not detected or received ultrasonic signals from mobile device 150 for a set period of time, and location information of the assigned vehicle indicating the assigned vehicle has not yet arrived at the destination location. In such an example, controller 110 can instruct the assigned vehicle to reroute and cease traveling towards the destination location specified by the requester, upon controller 110 determining that the requester has left the assigned vehicle prior to the assigned vehicle reaching the specified destination location.

In various examples, controller 110 can determine that the requester has left after the assigned vehicle has arrived at the destination location. In such examples, controller 110 can determine that the transport service has been completed for the requester. In some examples, based on the location information of the assigned vehicle and the destination location specified in the transport request, controller 110 can determine that the assigned vehicle has arrived at the destination location. In other examples, controller 110 can determine whether the doors have been opened and closed. If controller 110 determines the doors have been opened and/or closed after the assigned vehicle has arrived at the destination location, controller 110 can determine that the transport service is complete.

Additionally, controller 110 can confirm that a transport service is complete through ultrasonic detection. Service application 151 can be configured to cause mobile device 150 to emit ultrasonic transmissions to reflect, for example, a current state of the transport request. For example, mobile device 150 can emit ultrasonic signals repeatedly when the requester is receiving transport, and once the requester exits autonomous vehicle 10, controller 110 can interpret the cessation as a potential event coinciding with the requester's departure. This information can be used as a signal with other information (e.g., location of vehicle) to determine whether the requester has left the vehicle.

However, in some circumstances, controller 110 may determine that the requester may have left mobile device 150 in the vehicle after determining that the transport service is complete. For example, after controller 110 determines that the transport service is complete, the one or more interior sensors 180 may detect ultrasonic signal(s) from the requester's mobile device 150. In turn, the controller 110 can interpret the detected ultrasonic signals in context of other information, to determine that requester has left mobile device 150 inside autonomous vehicle 10. Controller 110 can then initiate an action to alert the user. For example, controller 110 may transmit a message to network service 170 to inform the requester that the mobile device 150 is in the vehicle.

Methodology

Figure 2:
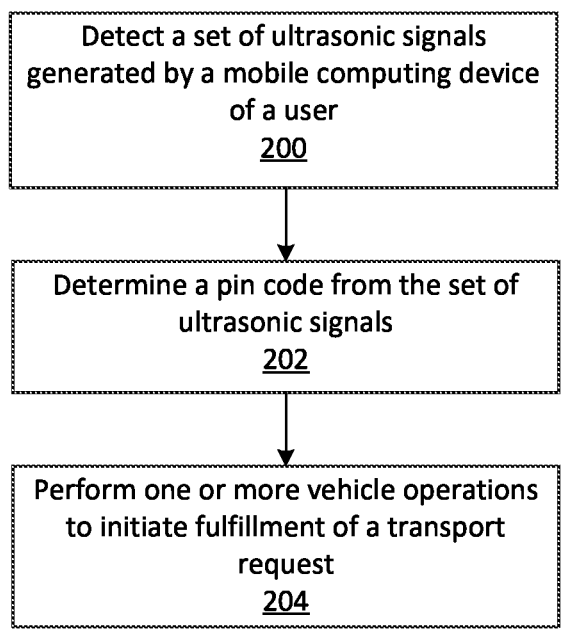
FIG. 2 illustrates an example method of utilizing ultrasonic signals to implement operations to initiate fulfillment of a transport request by a vehicle.
Figure 3:
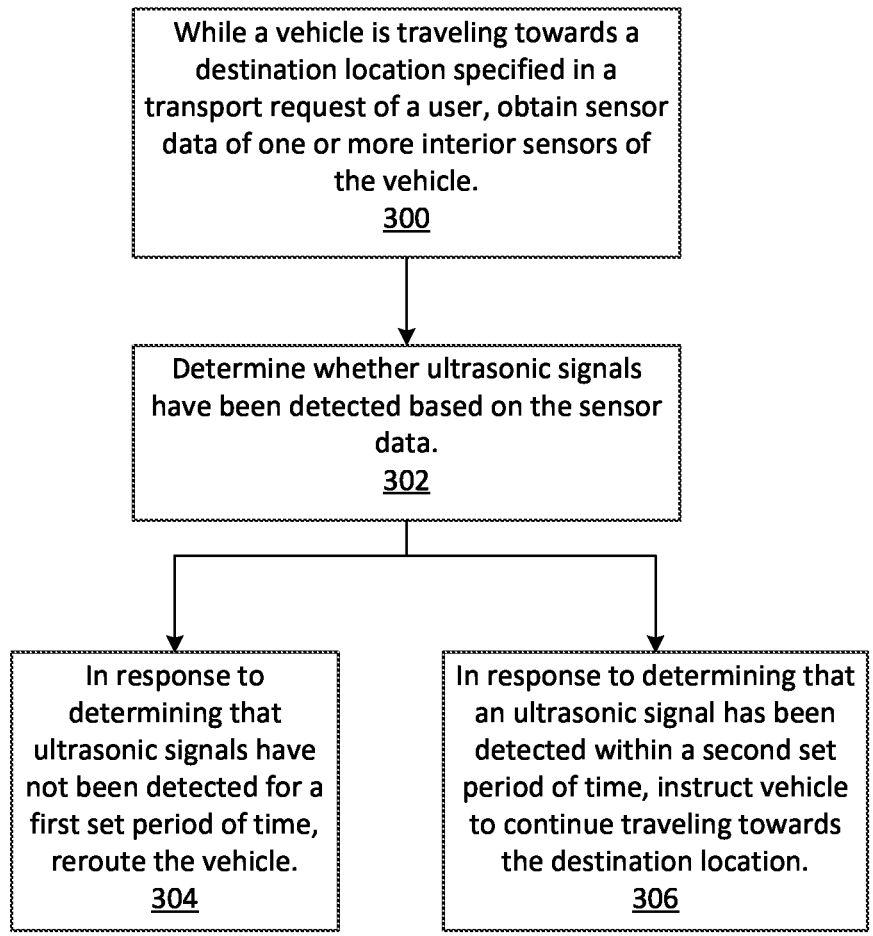
FIG. 3 illustrates an example method of utilizing ultrasonic signals to monitor a user while a transport service is in progress.
Figure 4:
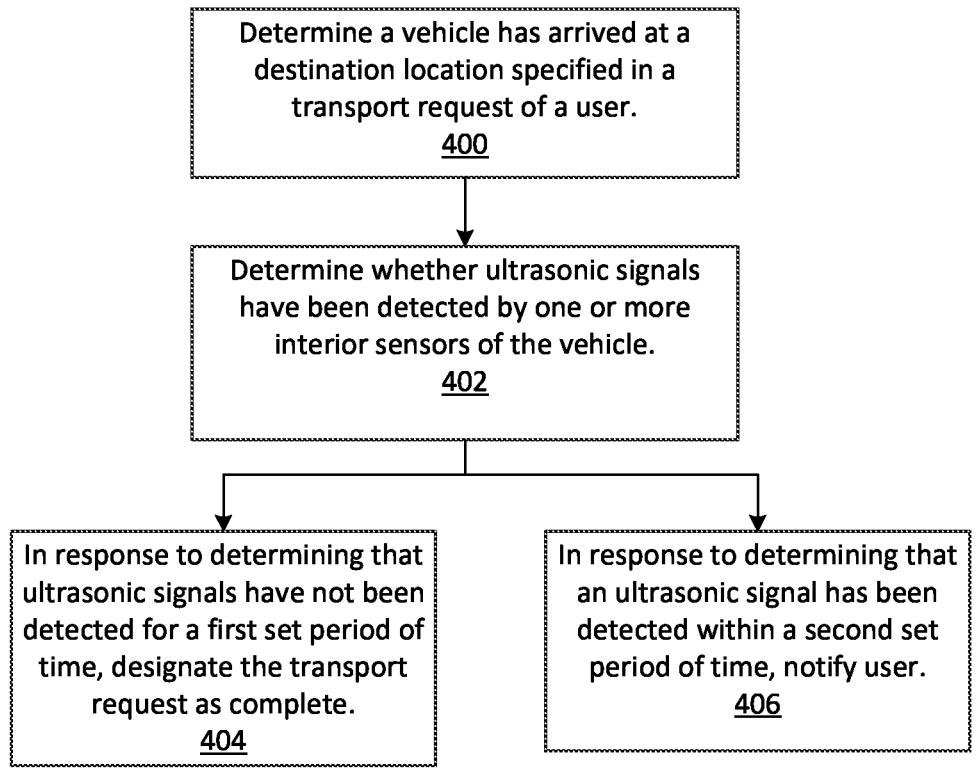
FIG. 4 illustrates an example method of utilizing ultrasonic signals to implement operations after a transport service is complete.

FIG. 2 illustrates an example method of utilizing ultrasonic signals to implement operations to initiate fulfillment of a transport request by a vehicle. FIG. 3 illustrates an example method of utilizing ultrasonic signals to monitor a user while a transport service is in progress. FIG. 4 illustrates an example method of utilizing ultrasonic signals to implement operations after a transport service is complete. In the below description of FIGS. 2-4, reference may be made to reference characters representing various features of FIG. 1.

With reference to FIG. 2, control system 100 can detect a set of ultrasonic signals generated by mobile device 150 of a user (200). In such examples, control system 100 can include UCS 120. UCS 120 can include audio receiving component 122, such as an array of microphones, that is responsive to an acoustic signal in the ultrasonic range or high frequency range (above 18 kHz). In some examples, control system 100 can be included with a vehicle. In various examples the vehicle can be an autonomous vehicle.

Control system 100 can determine a pin code from the set of ultrasonic signals (202). For example, controller 110 communicates with UCS 120 operate to (i) detect an ultrasonic signal from a source, and (ii) decode or otherwise determine a pin code from the detected ultrasonic signal.

Additionally, control system 100 can determine if the determined pin code corresponds to a unique pin code that is associated with the requester or user. Control system 100 can determine that the requester of mobile device 150 and the vehicle are assigned to one another. In such examples, network service 170 can provide to control system 100 the unique pin code based on a transport request of a user. Additionally, network service 170 can assign a particular vehicle to a requester based on a transport request the user made and a unique pin code for that particular assigned transport request and/or vehicle-requester assignment. In examples, network service 170 can transmit to control system 100 of the assigned vehicle and/or mobile device 150 of the user the unique pin code.

Upon control system 100 determining that the determined pin code corresponds to the unique pin code, control system 100 can trigger or initiate performance of one or more vehicle operations to initiate fulfillment of a transport request (204). Examples of vehicle operations include, opening one or more doors of the vehicle, and causing the vehicle to turn on and/or modulate one or more lighting elements of the vehicle (e.g., headlights or other lighting elements incorporated into the body of the vehicle).

In some implementations, control system 100 can trigger or initiate performance of the one or more vehicle operations upon the user being determined to be within a given proximity distance of the vehicle. In such implementations, control system 100 can monitor a current location of the user and determine if the user is within a proximity distance threshold of the assigned vehicle. In examples where control system 100 can communicate with network service 170, location information of mobile device 150 can be provided by network service 170. The location information of mobile device 150 can indicate the current location of the user. In examples where control system 100 cannot communicate with network service 170, control system 100 can determine a current location of a user based on encoded ultrasonic signals 183 outputted from mobile device 150.

FIG. 3 is a flow chart describing another example method of utilizing ultrasonic signals to monitor a user while a transport service is in progress. For example, while the transport service is in progress (e.g., a vehicle assigned to a transport request of a user is traveling towards a destination location specified in the transport request), controller 110 can obtain sensor data of the one or more interior sensors 180 of the vehicle (300). In some examples, the one or more interior sensors 180 can include a microphone or speaker that is configured to receive or is responsive to an acoustic signal in an ultrasonic range or a high frequency range (above 18 kHz). In such examples, the sensor data can indicate each instance the one or more interior sensors has received or detected an ultrasonic signal.

Controller 110 can determine whether ultrasonic signals have been detected based on the sensor data obtained from the one or more interior sensors 180 (302). In various examples, controller 110 can determine whether a user of mobile device 150 is still in the vehicle based on whether controller 110 can determine if ultrasonic signals can still be detected by the one or more interior sensors 180. For example, controller 110 determines that ultrasonic signals have not been detected for a set period of time based on the sensor data. In such an example, controller 110 can determine that the user of mobile device 150 has left the vehicle. In another example, controller 110 determines that ultrasonic signal 182 has been detected within a set period of time. In such an example, controller 110 can determine that the user of mobile device 150 is still in the vehicle.

In examples where controller 110 determines that the ultrasonic signals have not been detected for a first set period of time, controller 110 can cause or instruct the vehicle to reroute and cease traveling towards the destination location (304). That way, in circumstances where the user abruptly leave the vehicle, the vehicle does not have to continue fulfilling the transport request.

In examples where controller 110 determines that ultrasonic signal 182 has been detected within a second set period of time, controller 110 can cause or instruct the vehicle to continue traveling towards the destination location (306). In such examples, controller 110 can determine that the user is still in the vehicle, and therefore should still continue traveling towards the destination location that the user specified in the transport request of the user.

In examples, the first set period of time and the second set period of time can be different or similar.

FIG. 4 illustrates an example method of utilizing ultrasonic signals to implement operations after a transport service is complete. For example, controller 110 can determine that the assigned vehicle has arrived at a destination location specified in a transport request of a user (400). In examples, controller 110 can determine that the assigned vehicle has arrived at a destination location of a transport request, based on location information generated by a location-based resource (e.g., GPS data generated by a GPS sensor) of the assigned vehicle and the destination location specified in the transport request.

Additionally, controller 110 can determine whether ultrasonic signals have been detected by the one or more interior sensors 180 of the vehicle (402). For example, controller 110 can communicate with the one or more interior sensors 180 to monitor whether ultrasonic signals from mobile device 150 are still detectable by the one or more interior sensors 180. In some examples, controller 110 can determine whether the ultrasonic signals are still detectable by the one or more interior sensors 180 based on sensor data generated by the one or more interior sensors 180. For example, controller 110 can determine from sensor data generated by the one or more interior sensors 180 if ultrasonic signals have been detected. The sensor data can indicate each instance the one or more interior sensors 180 has received or detected the ultrasonic signals. In some examples, the one or more interior sensors 180 can be a microphone or speaker that is configured to receive or is responsive to an acoustic signal in an ultrasonic range or a high frequency range (above 18 kHz).

In various examples, controller 110 can determine whether mobile device 150 is still in the vehicle based on whether controller 110 determines if the ultrasonic signals are still being detected by the one or more interior sensors 180. For example, controller 110 determines that ultrasonic signals have not been detected for a set period of time based on the sensor data. In such an example, controller 110 can determine that mobile device 150 is no longer in the vehicle. In another example, controller 110 determines that the ultrasonic signals has been detected within a set period of time. In such an example, controller 110 can determine that mobile device 150 may still be in the vehicle.

In some implementations, controller 110 can cause mobile device 150 to output ultrasonic signals (e.g., ultrasonic signals 181 that correspond to the unique pin code). As such, controller 110 can determine from the sensor data whether or not ultrasonic signals are detected by the one or more interior sensors 180.

In examples where controller 110 determines that the ultrasonic signals have not been detected for a first set period of time, controller 110 can designate the transport request of the user as completed (404). In some examples, if controller 110 determines that ultrasonic signals have not been detected for a first set period of time, controller 110 can designate the transport request of the user as completed by transmitting a message to network service 170 to designate the transport service of the user as completed.

In examples where controller 110 determines that ultrasonic signal 182 has been detected within a second set period of time, controller 110 can notify the user (406). For example, controller 110 can transmit, to network service 170, a notification indicating that the user may have left mobile device 150 in the vehicle.

Still further, in other examples, the first set period of time and the second set period of time can be different or similar.

Hardware Diagram

Figure 5:
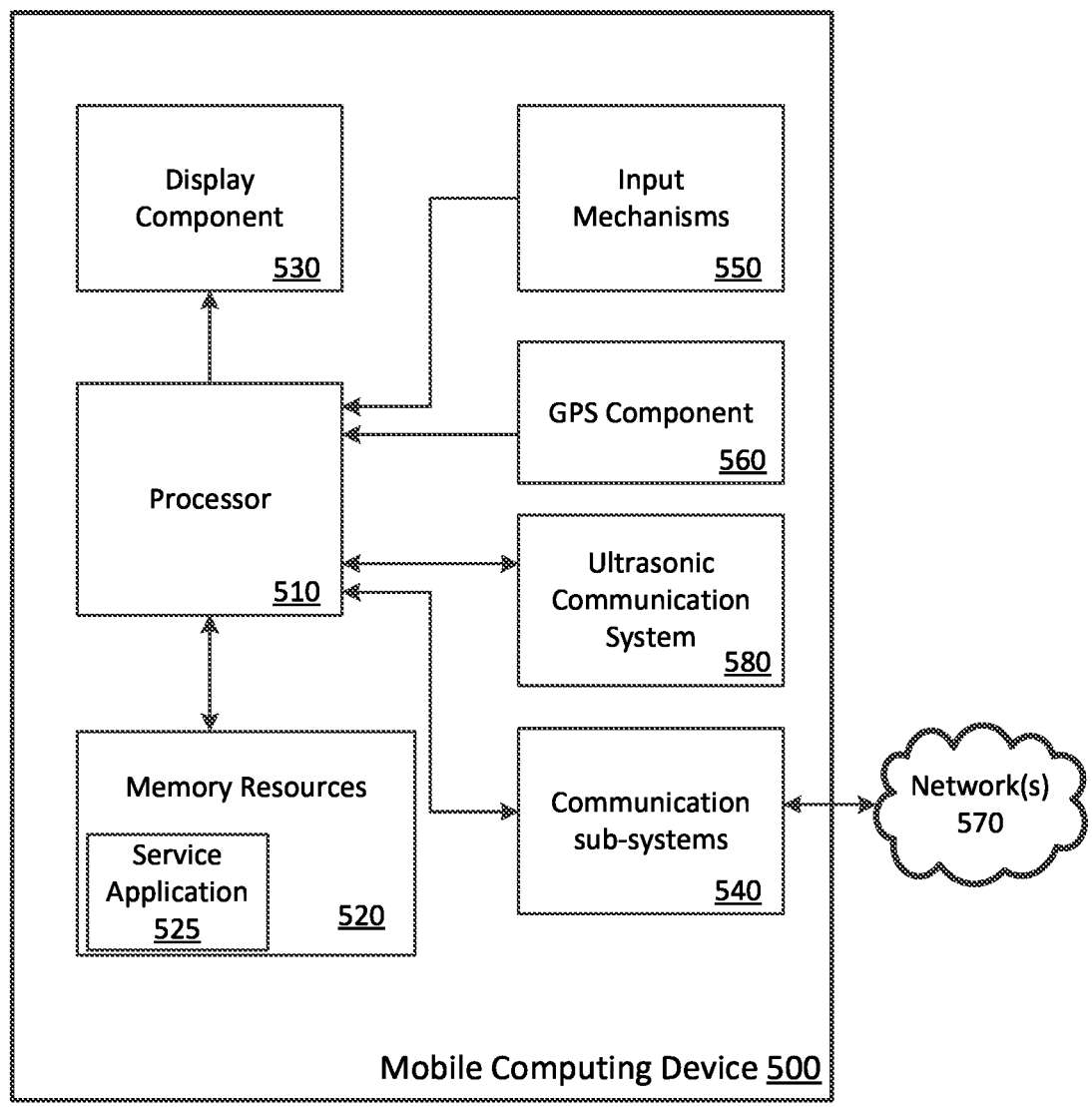
FIG. 5 illustrates a mobile device upon which aspects describe herein may be implemented.

FIG. 5 is a block diagram that illustrates a mobile device upon which examples described herein may be implemented. In one embodiment, mobile computing device 500 may correspond to, for example, a cellular device that is capable of telephony, messaging, and data services. In other examples, the mobile computing device 500 may correspond to an immersive-type computing device, such as an augmented-reality headset or wearable goggle device. The mobile computing device 500 can correspond to a device operated by a requester or, in some examples, a device operated by the service provider that provides location-based services. Examples of such devices include smartphones, handsets, tablet devices, or in-vehicle computing devices that communicate with cellular carriers. The mobile computing device 500 includes processor 510, memory resources 520, display component 530 (e.g., such as a touch-sensitive display device), one or more communication sub-systems 540 (including wireless communication systems), one or more input mechanisms 550 (e.g., accelerometer and/or gyroscope, microphone, barometer, etc.), one or more location detection components (e.g., GPS component) 560. In one example, at least one communication sub-system 540 sends and receives cellular data over network(s) 570 (e.g., data channels and voice channels). The one or more communication sub-systems 540 can include a cellular transceiver and one or more short-range wireless transceivers. Processor 510 can exchange data with a service arrangement system (not illustrated in FIG. 5) via the one or more communications sub-systems 540 and over network(s) 570.

Mobile computing device 500 can also include ultrasonic communication system (UCS) 580. UCS 580 can include an audio receiving component, such as a microphone array, which can be configured to detect ultrasonic signals. Additionally, UCS 580 can also include an emitter or audio output component to output ultrasonic signals. The audio output component can include a speaker that can emit an acoustic signal in the ultrasonic range or a high frequency range (above 18 kHz).

Processor 510 can provide a variety of content to display component 530 by executing instructions stored in memory resources 520. Memory resources 520 can store instructions for service application 525. For example, processor 510 can execute the service application 525 to read data from one or more input mechanisms 550 of the computing device, and to transmit the data, along with location data of GPS component 560 as local device data to a network computer system (e.g., network service 170).

In examples, processor 510 can retrieve from memory resources 520 instructions for executing a service application 525. As described with other examples, service application 525 can enable a user to request a transport service from a service arrangement system. In turn the service arrangement system can match the requester with a vehicle, such as an autonomous vehicle. Additionally, the user can specify one or more vehicle operations for the matched vehicle to perform when making the request using service application 525.

In various examples, service application 525 can be configured to cause mobile computing device 500 to emit ultrasonic signals. For example, the requester can use service application 525 to cause UCS 580 to emit ultrasonic signals. In some examples, the ultrasonic signals can be encoded with a pin and/or one or more commands. In such examples, the service arrangement system can communicate to mobile computing device 500 a pin code. Processor 510 and UCS 580 can encode and transmit the ultrasonic signal. In other examples, the ultrasonic signals can be used to range mobile computing device 500 with respect to the matched vehicle.

Figure 6:
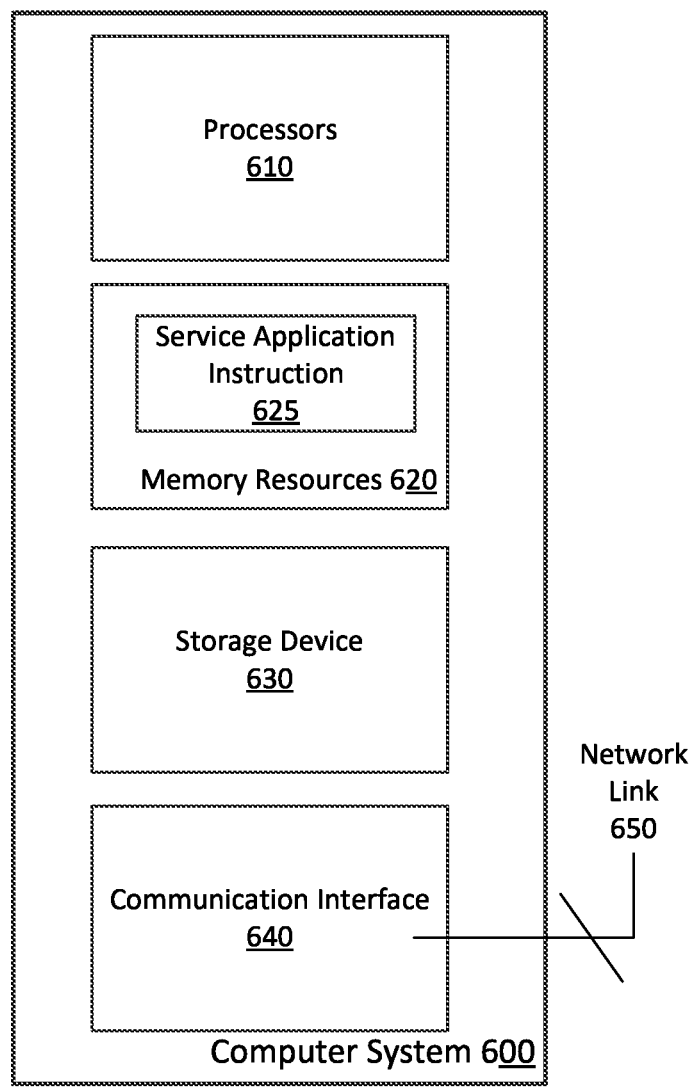
FIG. 6 illustrates a computer system on which one or more example control systems can be implemented.

FIG. 6 illustrates a computer system on which one or more example control systems can be implemented. Computer system 600 can be implemented on, for example, a server or combination of servers. For example, computer system 600 may be implemented as a server for a network computer system, such as shown and described with an example of FIG. 1. Likewise, computer system 600 can implement a method such as described with examples of FIG. 2, FIG. 3 and/or FIG. 4.

In one implementation, computer system 600 includes one or more processors 610, memory resources 620 (e.g., read-only memory (ROM) or random-access memory (RAM)), a storage device 630, and a communication interface 640. Computer system 600 includes at least one processor 610 for processing information stored in memory resources 620, such as provided by a random-access memory (RAM) or other dynamic storage device, for storing information and instructions which are executable by the one or more processors 610. Memory resources 620 also may be used for storing temporary variables or other intermediate information during execution of instructions to be executed by the one or more processors 610. Computer system 600 may also include memory resources 620 or other static storage device for storing static information and instructions for the one or more processors 610. Storage device 630, such as a magnetic disk or optical disk, is provided for storing information and instructions.

Communication interface 640 enables computer system 600 to communicate with one or more networks (e.g., cellular network) through use of network link 650 (wireless or a wire). Additionally, computer system 600 can utilize network link 650 to communicate with one or more computing devices, specialized devices and modules, and one or more servers. The executable instructions stored in memory resources 620 can include service application instructions 625, to implement a control system such as described with an example of FIG. 1. The executable instructions stored in memory resources 620 may also implement a method, such as described with one or more examples of FIGS. 3, 4 and/or 5.

As such, examples described herein are related to the use of computer system 600 for implementing the techniques described herein. According to an aspect, techniques are performed by computer system 600 in response to the one or more processors 610 executing one or more sequences of one or more instructions contained in memory resources 620. Such instructions may be read into memory resources 620 from another machine-readable medium, such as storage device 630. Execution of the sequences of instructions contained in memory resources 620 causes the one or more processors 610 to perform the process steps described herein. In alternative implementations, hard-wired circuitry may be used in place of or in combination with software instructions to implement examples described herein. Thus, the examples described are not limited to any specific combination of hardware circuitry and software.

Examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A control system for a vehicle, the control system comprising:
   an ultrasonic communication sub-system;
   one or more processors;
   a memory to store instructions, that when executed by the one or more processors, causes the vehicle to:
   communicate with the ultrasonic communication sub-system to detect a set of ultrasonic signals generated by a mobile computing device of a user as the user moves with respect to the vehicle;
   while the vehicle is without network access, cause an ultrasonic emitter of the vehicle to generate an audio output;
   from the set of ultrasonic signals, determine a direction of the user's movement with respect to the vehicle;
   select one or more vehicle operations to perform based at least in part on the direction of the user's movement with respect to the vehicle; and
   perform the one or more selected vehicle operations when a position of the user is within a threshold proximity distance to the vehicle.

2. The control system of claim 1, wherein the one or more processors execute the instructions to further cause the vehicle to:
   utilize one or more proximity sensors of the vehicle to determine a relative location of the user to the vehicle.

3. The control system of claim 1, wherein the audio output is an ultrasonic signal.

4. The control system of claim 1, wherein the one or more vehicle operations include automatically opening a trunk of the vehicle.

5. The control system of claim 1, wherein the one or more vehicle operations include automatically opening a door of the vehicle.

6. The control system of claim 1, wherein selecting one or more vehicle operations to perform includes selecting a door of the vehicle to unlock for the user.

7. The control system of claim 1, wherein the instructions, when executed by the one or more processors, cause the vehicle to:
   determine a pin code from the set of ultrasonic signals; and
   authorize the user based on the pin code.

8. The control system of claim 7, further comprising:
   a first communication interface to communicate with a network service;

wherein the instructions, when executed by the one or more processors, cause the vehicle to:
communicate with a network service to receive information for a transport request that is to be fulfilled using the vehicle, wherein the pin code is associated with the transport request.

9. The control system of claim 8, further comprising:
a second communication interface to communicate with the mobile computing device of the user;
wherein the instructions, when executed by the one or more processors, cause the vehicle to:
communicate with the mobile computing device of the user to determine a preference of the user; and
wherein the one or more selected vehicle operations include at least one vehicle operation that is selected based on the preference of the user.

10. The control system of claim 1, wherein ultrasonic communication sub-system is configured to determine when the mobile computing device of the user is within the vehicle.

11. A method comprising:
detecting a set of ultrasonic signals generated by a mobile computing device of a user as the user moves with respect to a vehicle;
from the set of ultrasonic signals, determining a direction of the user's movement with respect to the vehicle;
while the vehicle is without network access, causing an ultrasonic emitter of a vehicle to generate an audio output, the audio output being a second ultrasonic signal;
selecting one or more vehicle operations to perform based at least in part on the direction of the user's movement with respect to the vehicle; and
performing the one or more selected vehicle operations when a position of the user is within a threshold proximity distance to the vehicle.

12. The method of claim 11, further comprising:
utilizing one or more proximity sensors of the vehicle to determine a relative location of the user to the vehicle.

13. The method of claim 11, wherein selecting one or more vehicle operations to perform includes selecting a door of the vehicle to unlock for the user.

14. The method of claim 11, further comprising:
determining a pin code from set of ultrasonic signals; and
authorizing the user based on the pin code.

15. The method of claim 14, further comprising:
communicating, using a first communication interface, with a network service to receive information for a transport request that is to be fulfilled using the vehicle, wherein the pin code is associated with the transport request.

16. The method of claim 14, further comprising:
communicating, using a second communication interface, with the mobile computing device of the user to determine a preference of the user; and
wherein the one or more selected vehicle operations include at least one vehicle operation that is selected based on the preference of the user.

17. The method of claim 11, further comprising determining when the user is within the threshold proximity using an ultrasonic communication receiver.

18. A non-transitory computer readable medium storing instructions that, when executed by one or more processors of a vehicle control system, cause the vehicle control system to:
detect a set of ultrasonic signals generated by a mobile computing device of a user as the user moves with respect to the vehicle;
while the vehicle is without network access, causing an ultrasonic emitter of a vehicle to generate an audio output, the audio output being a second ultrasonic signal;
from the set of ultrasonic signals, determine a direction of the user's movement with respect to the vehicle;
select one or more vehicle operations to perform based at least in part on the direction of the user's movement with respect to the vehicle; and
perform the one or more selected vehicle operations when a position of the user is within a threshold proximity distance to the vehicle.

19. The non-transitory computer readable medium of claim 18, wherein selecting one or more vehicle operations to perform includes selecting a door of the vehicle to unlock for the user.

20. The non-transitory computer readable medium of claim 18, wherein the operations further comprise:
utilizing one or more proximity sensors of the vehicle to determine a relative location of the user to the vehicle.

* * * * *